United States Patent [19]

Walsh

[11] 4,124,834

[45] Nov. 7, 1978

[54] ELECTRICAL INDUCTIVE APPARATUS

[75] Inventor: Edward J. Walsh, Hermitage, Pa.

[73] Assignee: Westinghouse Electric Corp., Pittsburgh, Pa.

[21] Appl. No.: 839,532

[22] Filed: Oct. 5, 1977

[51] Int. Cl.² ............................................. H01F 27/10
[52] U.S. Cl. .................................. 336/58; 174/14 R; 361/318
[58] Field of Search ...................... 336/92, 58, 55, 57; 174/14 R; 361/318, 319

[56] References Cited

U.S. PATENT DOCUMENTS

| 3,090,705 | 5/1963 | Miksits | 361/319 X R |
| 3,363,156 | 1/1968 | Cox | 361/318 |

*Primary Examiner*—Thomas J. Kozma
*Attorney, Agent, or Firm*—D. R. Lackey

[57] ABSTRACT

Electrical inductive apparatus having a tank, an insulating and cooling liquid in the tank, and an electrical winding structure immersed in the liquid. The insulating liquid includes an inorganic constituent in its formulation. The insulating liquid also includes a toxic organic contaminant which continuously leaches into the insulating liquid from the electrical winding structure. An adsorbent material is in fluid flow communication with the insulating liquid to remove the contaminant on a continuous basis by contact adsorption, to maintain the degree of contamination of the insulating liquid below a predetermined level.

10 Claims, 1 Drawing Figure

U.S. Patent
Nov. 7, 1978
4,124,834
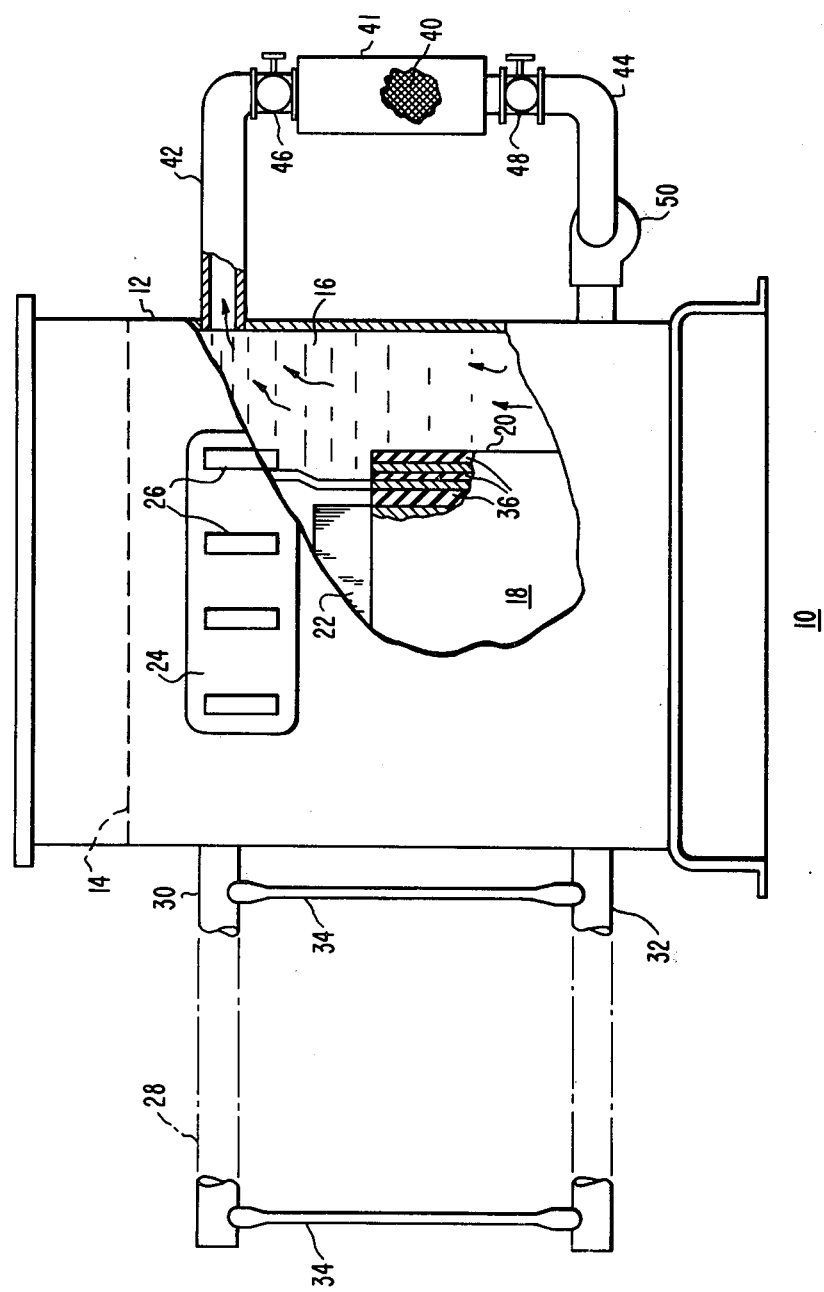

ELECTRICAL INDUCTIVE APPARATUS

BACKGROUND OF THE INVENTION

1. Field of the Invention

The invention relates in general to electrical inductive apparatus, such as transformers, and more specifically to electrical inductive apparatus which includes a liquid dielectric and coolant.

2. Description of the Prior Art

Since the early 1930's, electrical transformers for use in or adjacent to buildings, or other occupied areas, and on electric railroad cars, have been constructed with a polychlorinated biphenyl insulating and cooling liquid, which liquids are commonly called PCB's. The PCB's, which have a high dielectric strength, were chosen for these applications because of their fire-resistant characteristics.

The PCB's are toxic, i.e., they have the capacity to produce injury or illness to humans and animals through absorption, inhalation or ingestion, and strict procedures have always been observed in their handling, use and disposal. The PCB's, however, have a high chemical stability and despite strict handling and disposal procedures, they have appeared as a pollutant in areas of great industrial activity. Thus, the Federal Toxic Substances Control Act, passed in 1976, has made it mandatory that the use of PCB's in industry be phased out over a short period of time.

Silicone liquids, such as mixtures of the dimethyl siloxane polymers, have good electrical and fire-resistant characteristics, and they are non-toxic. Thus, the dimethyl-silicone liquids, such as Dow Corning's DC-561, are now being used in new electrical transformers for applications which formerly would use a PCB-filled transformer.

In certain instances, it would be desirable to retrofit existing PCB-filled transformers with an acceptable non-toxic, fire-resistant liquid, such as the silicone liquids. For example, when a PCB-filled transformer is repaired, the PCB liquid will be properly disposed of and the transformer filled with an acceptable substitute. Also, in certain applications, such as railway transformers, it may be desirable to replace the PCB's with an acceptable substitute on a scheduled basis, even though the transformers would not otherwise require repair.

The retrofitting of a PCB-filled transformer with an acceptable substitute liquid, however, quickly results in the contamination of the new liquid above the acceptable 500 part per million level. The PCB's have impregnated the solid cellulosic insulation (wood and paper), and other fibrous insulating materials used in the transformer, and the PCB's continuously leach out of the solid insulation into the originally acceptable liquid substitute. It is too costly to periodically check such retrofilled transformers for PCB pollution level, and to then replace the contaminated liquid when the PCB content exceeds 500 parts per million. Thus, while it would be desirable to retrofit a PCB-filled transformer by removing the PCB liquid and replacing it with an acceptable substitute, the PCB's and the new liquid must be economically maintained below 500 parts per million, before such retrofitting would be practical.

SUMMARY OF THE INVENTION

Briefly, the present invention is a new and improved transformer having a tank, and an insulating and cooling liquid disposed in the tank. The insulating liquid has an inorganic constituent in its formulation, such as silicon in the silicone oil polymers. An electrical winding is immersed in the insulating liquid, which winding is adapted for connection to an electrical potential and to a load circuit. The insulating liquid includes an organic contaminant such as a PCB, which leaches into the insulating liquid from the solid insulation in the winding, which insulation is impregnated with the toxic contaminant. The insulating liquid is continuously passed through an adsorbent material, during the operation of the transformer, which material is selected to adsorb the organic contaminant while being substantially unaffected by the basically inorganic nature of the insulating liquid. Activated carbon has been found to provide excellent results, and it is also readily available and economically attractive. In a preferred embodiment of the invention, the flow of the liquid through the adsorbent material is by thermal siphon effect, provided by the thermal gradient in the liquid created by the heat produced in the electrical winding and associated magnetic core, and the cooling of the heated liquid in external radiators or coolers.

BRIEF DESCRIPTION OF THE DRAWING

The invention may be better understood, and further advantages and uses thereof more readily apparent, when considered in view of the following detailed description of exemplary embodiments, in which the single FIGURE is an elevational view, shown partially in section, of electrical inductive apparatus constructed according to the teachings of the invention.

DESCRIPTION OF PREFERRED EMBODIMENTS

Referring now to the drawing, the single FIGURE illustrates electrical inductive apparatus 10, such as an electrical power transformer, constructed according to the teachings of the invention. Apparatus 10 includes a tank 12 which is filled to a level 14 with an insulating and cooling liquid 16 having an inorganic constituent in its formulation. Liquid 16 is preferably a silicone liquid, such as polydimethylsiloxane, which is a highly stable, long-chained, high molecular weight polymer whose backbone consists of the stable Si—O—Si bond. Dielectric grades of such silicone liquids are commercially available and widely used in electrical transformer applications, such as the hereinbefore mentioned Dow Corning DC-561.

An electrical winding-magnetic core assembly 18, having at least one electrical winding 20 disposed in inductive relation with a magnetic core 22, is disposed in the tank 12 and immersed in the liquid 16. In a typical construction, the electrical winding-magnetic core assembly 18 has high voltage bushings (not shown) adapted for connection to a source of electrical potential, which bushings are connected to a high voltage winding in the assembly 18. A low voltage bushing structure is also provided, such as an insulating member 24 disposed to seal an opening in the tank wall through which a plurality of electrical conductors 26 pass. Conductors 26 are internally connected to a low voltage winding, or windings, and their external ends are adapted for connection to a load circuit outside of the transformer.

During the operation of electrical inductive apparatus 10, the electrical winding-magnetic core assembly 18 produces heat due to $I^2R$ losses in the conductive turns of the windings, and core losses, which create a thermal gradient through the insulating liquid, with the higher temperature liquid being at the top of the liquid.

The liquid 16 is cooled by a plurality of radiators or coolers 28, through which the liquid 16 circulates by the thermal siphon effect. The radiators 28 are in fluid flow communication with the liquid 16, such as by vertically spaced headers 30 and 32 which are welded to the tank wall, and a plurality of flat steel tubes 34 are welded between the headers. The warmer liquid 16 exits the tank 12 near but below the level 14 of the liquid 16 via header 30, and it flows downwardly through the flattened tubes 34 into the lower header 32 which directs the cooled liquid 16 back into the tank 12. Thus, a continuous flow of cooled liquid 16 flows upwardly over and through the winding-core assembly 18 to remove the heat therefrom. The number of headers and tubes in the cooler 28 are selected according to the KVA rating and maximum temperature rise rating of the apparatus.

Electrical inductive apparatus 10 has a toxic organic contaminant in the insulating liquid 16, such as a PCB contaminant, which must be maintained below a predetermined maximum concentration. Apparatus 10 will usually be the result of a retrofit, with the apparatus originally being manufactured with an askarel insulating liquid. The askarel insulating liquids are mixtures of polychlorinated biphenyls and chlorinated benzenes, which are broadly referred to as PCB's in the transformer art. The PCB's are organic and non-polar. While the PCB liquid can be removed from the transformer tank, it impregnates the solid insulation used in the winding-core assembly 18, such as the cellulosic and other fibrous insulation used in the transformer. These PCB's in the solid insulation leach out of the insulation, such as the solid insulation shown generally at 36 of winding 20, and they contaminate the new insulating liquid 16. The contamination of the PCB's in the insulating liquid 16 will increase with time and will exceed the allowable 500 part per million concentration.

The present invention presents an economical solution to the contamination problems in a retrofit. It has been found that the contamination of the PCB's in a primarily inorganic, non-polar liquid polymer, such as the silicone liquid, can be maintained below the maximum concentration of 500 ppm by passing the liquid 16 through an activated carbon filter 40. Activated carbon, which is also referred to as activated charcoal, or simply filter carbon, depending upon the starting material, is a nearly chemically pure amorphous carbon. Activated carbon may be made from coal, hard wood, or other dense organic materials such as peach pits and coconut shells.

In a preferred embodiment of the invention, the activated carbon filter is mounted in a housing 41 external to the tank 12, for ease in replacement of the filter cartridges.

One or more of the headers of one or more of the coolers 28 may be modified to accept an activated carbon filter, with suitable valving to enable the filter to be replaced without loss of coolant; or, as illustrated in the FIGURE, the activated carbon filter 40 may be mounted in its own separate fluid flow path. For example, the fluid flow path for the activated carbon filter may proceed from the tank 16 to the housing 41 of the activated filter 40 via a header, tube or conduit 42, and from the housing 41 back to the tank via a conduit 44. Valves 46 and 48 are located such that the filter 40 may be periodically replaced, and properly disposed of, without leakage of the liquid 16.

In a preferred embodiment of the invention, the fluid flow through the activated carbon filter 40 is by thermal siphon effect, with conduit 42 being located in fluid flow communication with the upper, warmer liquid 16, and conduit 44 being located in fluid flow communication with the lower cooler liquid.

A pump 50 may be disposed in the fluid flow path which includes the activated carbon filter 40, if desired, but in general, adequate removal rates of the PCB contaminate may be achieved without a pump, using the hereinbefore mentioned thermal siphon effect.

Activated carbon available commercially to purify water includes a mixture of grain sizes. A 30 gram sample of this carbon in a 0.5 inch glass tube reduced a 500 PPM concentration of PCB's in silicone oil to less than 2 PPM in one pass at flow rates of 1 ml per minute, and also at 2 ml per minute. More finely ground carbon is just as effective. A greater packing density merely reduces the flow rate.

In the transformer application of the invention the actual flow rate is not critical, as the process may be carried out continuously. Of more importance is the capacity of the carbon. Tests indicate 300 grams of carbon will remove at least 2.88 grams of PCB's from a silicone oil.

In summary, there has been disclosed new and improved electrical inductive apparatus with on-line, continuous removal of a non-polar, organic toxic contaminant from a non-polar, non-toxic insulating and cooling liquid which is basically inorganic in nature. The invention thus makes it practical to retrofit electrical inductive apparatus, such as power transformers, which were originally manufactured with a PCB liquid coolant and dielectric, with an inorganic liquid coolant and dielectric, such as one of the silicone fluids. The on-line continuous removal of the PCBs, as they leach from the solid insulation of the electrical inductive apparatus into the new liquid, prevents the new liquid from exceeding prescribed maximum limits of PCB's.

I claim as my invention:
1. An electrical transformer, comprising;
   a tank,
   a polymeric insulating liquid having an inorganic backbone disposed in said tank,
   a toxic, organic contaminant in said insulating liquid,
   an electrical winding disposed in said tank, said electrical winding being immersed in said insulating liquid,
   and an adsorbent material disposed in fluid flow communication with said insulating liquid, said adsorbent material being selected to adsorb the organic contaminant in said insulating liquid, with insignificant adsorption of the insulating liquid.
2. The electrical transformer of claim 1 wherein the electrical winding includes solid electrical insulation having a PCB impregnant, said PCB impregnant leaching into the insulating liquid to create the organic contaminant therein.
3. The electrical transformer of claim 1 wherein the insulating liquid has a thermal gradient during the operation of the electrical winding, and including fluid conduit means connected in fluid flow communication with the tank and with the adsorbent material, said fluid conduit means being connected to the tank such that the thermal gradient in the insulating liquid forces the insu- lating liquid through the fluid conduit means and the adsorbent material by thermal siphon effect.

4. The electrical transformer of claim 1 wherein the adsorbent material is activated carbon.

5. The electrical transformer of claim 1 including fluid conduit means connected in fluid flow communication with the tank and the adsorbent material, and pump means disposed to pump the insulating liquid from the tank through the fluid conduit means, through the adsorbent material, and back to the tank.

6. The electrical transformer of claim 1 wherein the insulating liquid is a silicone liquid.

7. A retrofitted electrical transformer which was previously filled with a PCB insulating and cooling liquid, comprising:
   a tank,
   a silicone liquid disposed in said tank,
   an electrical winding having solid insulation impregnated with a PCB insulating liquid, said electrical winding being immersed in said silicone liquid,
   an adsorbent material for removing PCBs which leach into the silicone liquid,
   and conduit means in fluid flow communication with said tank for directing the flow of said silicone fluid from said tank, through said adsorbent material, and back to said tank.

8. The retrofitted electrical transformer of claim 7 wherein the operation of the electrical winding creates a thermal gradient in the silicone liquid, and wherein the conduit means is connected to the tank such that the thermal gradient forces the silicone liquid to flow through the adsorbent material by thermal siphon effect.

9. The retrofitted electrical transformer of claim 7 wherein the adsorbent material is activated carbon.

10. The retrofitted electrical transformer of claim 7 including pump means disposed to pump the silicone liquid through the conduit means and through the adsorbent material.

* * * * *

Disclaimer 4,124,834.—*Edward J. Walsh,* Hermitage, Pa. ELECTRICAL INDUCTIVE APPARATUS. Patent dated Nov. 7, 1978. Disclaimer filed Apr. 29, 1983, by the assignee, *Westinghouse Electric Corp.*

Hereby enters this disclaimer to all claims of said patent.

[*Official Gazette July 5, 1983.*]